United States Patent Office 2,914,499
Patented Nov. 24, 1959

2,914,499

EMULSION POLYMERIZATION WITH ACRYLIC-TYPE ACID ESTERS OF HYDROXYSULFONIC ACIDS AND COMPOSITION THEREFROM

David P. Sheetz, Midland, Mich., assignor to The Dow Chemical Company, Midland, Mich., a corporation of Delaware No Drawing. Application March 25, 1957
Serial No. 647,975

15 Claims. (Cl. 260—29.6)

This invention concerns an improved process and composition for aqueous emulsion polymerization of polymerizable ethylenically unsaturated compounds to obtain very stable aqueous colloidal dispersion of polymers. It particularly concerns the preparation of stable aqueous colloidal dispersions of polymeric products that comprise a small but appreciable proportion of a sulfo ester of an α-methylene carboxylic acid or its salt.

In the well-known art of emulsion polymerization, a monomeric, usually water-insoluble, liquid composition comprising a polymerizable, ethylenically unsaturated compound, such as styrene, butadiene, methyl methacrylate, ethyl acrylate, vinyl acetate, vinyl chloride, or vinylidene chloride, or certain mixtures thereof, is colloidally emulsified in an aqueous medium that usually contains a wetting agent or surfactant, such as a water-soluble alkali soap, and a polymerization catalyst such as potassium persulfate. The resulting colloidal emulsion is then subjected to conditions conducive to polymerization of the monomeric constituents to produce an aqueous colloidal dispersion of the corresponding polymeric product, the aqueous colloidal dispersion being commonly called a latex.

The stability of the resulting polymer latex (aqueous colloidal dispersion) against coagulation or precipitation of its polymer ingredient depends at least in part upon the kind and amount of surfactants and the like that are contained in the aqueous suspending medium. In many instances, the dispersions are quite unstable, particularly when subjected to mechanical agitation, to heat or cold, or upon addition to the dispersion of polyvalent ions such as ionized calcium salts, such influences causing coagulation of the polymer particles. In some instances, the stability of the latex can be improved by adding further amounts of surfactants or other stabilizers to the colloidal dispersions after completion of the polymerization step. However, latexes stabilized with external surfactants are stable only to a limited degree and are more or less vulnerable to external destabilization.

Moreover, in many instances and for many purposes the conventionally-employed water-soluble surfactants and stabilizers (added to increase the latex stability) are ultimately objectionable. For example, in coatings derived from aqueous latexes by evaporation of water from a layer of such latex, the non-volatile surfactants remain together with the polymer deposit; in many instances the water-soluble ingredients of the coating seriously and deleteriously affect the quality of the coating.

Many uses of aqueous colloidal dispersions of polymers make seemingly contradictory demands, namely (1) that the dispersions be stable, and (2) that the dispersions contain as little water-soluble material as possible.

It is an object of this invention to provide a process, and compositions therefor, for aqueous emulsion polymerization whereby to obtain stable aqueous colloidal dispersions of solid polymeric materials.

A further object is to provide such a process, and compositions therefor, whereby to obtain stable polymer dispersions that contain only small proportions of water-soluble constituents.

Other objects and advantages of the invention will be evident in the following description.

The objects of this invention have been attained in a method of emulsion polymerization, and compositions therefor, wherein the aqueous colloidal polymer dispersion comprises a small but appreciable proportion of a sulfo ester of an α-methylene carboxylic acid polymerically combined therein.

The process of this invention (more completely described hereinafter) comprises dispersing a monomeric liquid composition comprising at least one polymerizable, ethylenically unsaturated compound (other than a sulfo ester of an α-methylene carboxylic acid), that is capable of undergoing addition polymerization to form substantially water-insoluble addition polymers, into an aqueous medium comprising a sulfo ester of an α-methylene carboxylic acid and subjecting the resulting dispersion to conditions conducive to polymerization.

It has now been discovered that when substantially water-insoluble polymeric products of ethylenically unsaturated compounds comprise sulfo esters of α-methylene carboxylic acids and are prepared in aqueous colloidal dispersion and in accordance with this invention, such polymer products are internally stabilized in the aqueous colloidal dispersion, and that the resulting dispersions are very stable, even without the presence therein of water-soluble surfactants and stabilizers. It may be suggested that the dispersions contain solid polymer particles in which the sulfo esters of α-methylene carboxylic acids are polymerically combined and in which the surface layer of the polymer particles contains such polymerically combined sulfo ester oriented in such a way as to present a plurality of sulfonic acid ion groups to the ambient aqueous suspending medium. If such be so, it is evident that the agent responsible for the stabilization of the dispersion is internally and securely bound in the solid colloidal polymer particles and not merely externally and loosely attracted thereto.

The sulfo esters of α-methylene carboxylic acids with which the present invention is concerned are described and claimed in a pending application, Serial No. 647,974, filed concurrently herewith by Walter J. Le Fevre and David P. Sheetz. These esters are obtainable by interaction of an α-methylene carboxylic acid or acid chloride and a hydroxy sulfonic acid. Specific examples of α-methylene carboxylic acids from which the sulfo esters can be obtained are Acrylic acid
Methacrylic
α-Ethylacrylic acid
α-Propylacrylic acid
α-Butylacrylic acid
α-Pentylacrylic acid
α-Hexylacrylic acid
Atropic acid
α-Cyclohexylacrylic acid
α-Furylacrylic acid
α-Chloroacrylic acid Specific examples of hydroxy sulfonic acid compounds (and their salts) that can be esterified with the α-methylene carboxylic acids (or their acid halides) to produce the corresponding sulfo esters are 2-hydroxyethanesulfonic acid (isethionic acid)
2-hydroxy-1-propanesulfonic acid
1-hydroxy-2-propanesulfonic acid
2-hydroxy-1-butanesulfonic acid
1-hydroxy-2-butanesulfonic acid
3-hydroxy-2-butanesulfonic acid
1-hydroxy-2-methyl-2-propanesulfonic acid 2-hydroxy-2-methyl-1-propanesulfonic acid
3-bromo-1-hydroxy-2-propanesulfonic acid
3-bromo-2-hydroxy-1-propanesulfonic acid
3-chloro-1-hydroxy-2-propanesulfonic acid
3-chloro-2-hydroxy-1-propanesulfonic acid
1-bromo-2-hydroxy-3-butanesulfonic acid
1-bromo-3-hydroxy-2-butanesulfonic acid
1-chloro-2-hydroxy-3-butanesulfonic acid
1-chloro-3-hydroxy-2-butanesulfonic acid
3-bromo-1-hydroxy-2-butanesulfonic acid
3-bromo-2-hydroxy-1-butanesulfonic acid
3-chloro-1-hydroxy-2-butanesulfonic acid
3-chloro-2-hydroxy-1-butanesulfonic acid
1-chloro-2-hydroxy-2-methyl-3-propanesulfonic acid
1-chloro-3-hydroxy-2-methyl-2-propanesulfonic acid
1 - chloro - 2 - (chloromethyl) - 2 - hydroxy - 3 - propanesulfonic acid
1 - chloro - 2 - (chloromethyl) - 3 - hydroxy - 2 - propanesulfonic acid
1-hydroxy-3-methoxy-2-propanesulfonic acid
2-hydroxy-3-methoxy-1-propanesulfonic acid
2-hydroxycyclohexanesulfonic acid
2-hydroxy-2-phenylethanesulfonic acid
2-hydroxy-1-phenylethanesulfonic acid
2 - bromo - 3 - hydroxy - 2 - methyl - 3 - phenyl - 1 - propanesulfonic acid
3-hydroxy-1-propanesulfonic acid
3-hydroxy-1-butanesulfonic acid
1-hydroxy-3-butanesulfonic acid
4-hydroxy-1-butanesulfonic acid
ar-Phenolsulfonic acid
ar-(2-hydroxyethoxy)benzenesulfonic acid.

The term "sulfo ester" is used herein to mean a compound having the formula

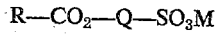

wherein the radical R— is selected from the group consisting of vinyl and α-substituted vinyl, the radical —Q— is a divalent hydrocarbon radical having its valence bonds on different carbon atoms, and M is a cation. Such sulfo-ester is equivalent to a carboxylate ester of an α-methylene carboxylic acid and a hydroxy organic compound, which latter compound has, as substituent on a carbon atom thereof, a sulfo group, i.e. a sulfonic acid group (—SO$_3$H) or a salt thereof such as a sodiosulfo (—SO$_3$Na) group. The sulfo esters of α-methylene carboxylic acids are also representable by the formula

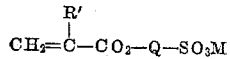

wherein the symbol R' represents hydrogen, a halogen such as chlorine, or an organic radical such as an alkyl radical, the symbol —Q— represents a bivalent organic radical having its valence bonds on two different carbon atoms, such as an alkylene radical, and M is a member of the group consisting of hydrogen, ammonium bases, and metals.

Specific examples of sulfo esters of α-methylene carboxylic acids which are suitable for making the interpolymers of the present invention are the following (and their sulfonate salts):

2-sulfoethyl acrylate
2-sulfoethyl methacrylate
2-sulfoethyl α-ethylacrylate
2-sulfoethyl α-propylacrylate
2-sulfoethyl α-butylacrylate
2-sulfoethyl α-hexylacrylate
2-sulfoethyl α-cyclohexylacrylate
2-sulfoethyl α-chloroacrylate
2-sulfo-1-propyl acrylate
2-sulfo-1-propyl methacrylate
1-sulfo-2-propyl acrylate and methacrylate
2-sulfo-1-butyl acrylate and methacrylate
1-sulfo-2-butyl acrylate and methacrylate
3-sulfo-2-butyl acrylate and methacrylate
2-methyl-2-sulfo-1-propyl acrylate
2-methyl-1-sulfo-2-propyl acrylate
3-bromo-2-sulfo-1-propyl acrylate
3-bromo-1-sulfo-2-propyl acrylate
3-chloro-2-sulfo-1-propyl acrylate
3-chloro-1-sulfo-2-propyl acrylate
1-bromo-3-sulfo-2-butyl acrylate
1-bromo-2-sulfo-3-butyl acrylate
1-chloro-3-sulfo-2-butyl acrylate
1-chloro-2-sulfo-3-butyl acrylate
3-bromo-2-sulfo-1-butyl acrylate
3-bromo-1-sulfo-2-butyl acrylate
3-chloro-2-sulfo-1-butyl acrylate
3-chloro-1-sulfo-2-butyl acrylate
1-chloro-2-methyl-3-sulfo-2-propyl acrylate
1-chloro-2-methyl-2-sulfo-3-propyl acrylate
1-chloro-2-(chloromethyl)-3-sulfo-2-propyl acrylate
1-chloro-2-(chloromethyl)-2-sulfo-3-propyl acrylate
3-methoxy-2-sulfo-1-propyl acrylate
3-methoxy-1-sulfo-2-propyl acrylate
2-sulfocyclohexyl acrylate
2-phenyl-2-sulfoethyl acrylate
1-phenyl-2-sulfoethyl acrylate
3-sulfo-1-propyl acrylate
3-sulfo-1-butyl acrylate
4-sulfo-1-butyl acrylate
ar-Sulfophenyl acrylate
ar-Sulfophenyl methacrylate
2-(ar-sulfophenoxy)ethyl acrylate.

In some of these sulfo esters, e.g. in esters of hydroxy alkanesulfonic acid, the bivalent radical corresponding to the symbol —Q— in the aforementioned formulae has both valence bonds on aliphatic carbon atoms; in others, e.g. in esters of phenolsulfonic acids, both valence bonds of the radical are on aromatic nuclei, while in still others, one of the valence bonds is on an aromatic nucleus and the other is on an aliphatic carbon atom.

These sulfo esters are in most instances liquids that are soluble in water and that form salts with ammonium bases, such as ammonia and organic amines, with metal bases such as the alkali metal and alkaline earth metal bases, and with other base-acting reagents. The salts of the sulfo esters are in most instances crystalline solids that are soluble in water, slightly soluble in lower alcohols, and insoluble in most other organic liquids.

There are many known polymerizable, ethylenically unsaturated compounds that can be polymerized while dispersed in aqueous media by means already known per se to produce aqueous colloidal dispersions of substantially water-insoluble solid polymer products. These can now be advantageously polymerized in aqueous dispersions that comprise one of the sulfo esters of the class defined above in accordance with this invention.

Among such other known polymerizable ethylenically unsaturated compounds are the alkenyl-aromatic compounds, i.e. the styrene compounds, the derivatives of ethylenically unsaturated acids such as the acrylic esters, acrylic nitriles, maleic esters, and unsaturated alcohol esters, and unsaturated ketones, unsaturated ethers, and other compounds containing one or more ethylenic linkages capable of addition polymerization. Specific examples of such ethylenically unsaturated compounds are styrene, α-methylstyrene, ar-methylstyrene, ar-ethylstyrene, α,ar-dimethylstyrene, ar,ar-dimethylstyrene, vinylnaphthalene, hydroxystyrene, methoxystyrene, cyanostyrene, acetylstyrene, mono-chlorostyrene, dichlorostyrene and other halostyrenes, methyl methacrylate, ethyl, acrylate, hexyl acrylate, lauryl methacrylate, phenyl acrylate, acrylonitrile, methacrylonitrile, acrylanilide, ethyl α-chloroacrylate, ethyl maleate, polyglycol maleate, vinyl acetate, vinyl propionate, vinyl butyrate, vinyl benzoate, vinyl chloride, vinyl bromide, vinylidene chloride, vinylidene bromide, vinyl methyl ketone, isopropenyl ketone, vinyl ethyl ether, 1,3-butadiene, isoprene, and the like.

The improved process of polymerization according to this invention comprises preparing an aqueous dispersion comprising an aqueous medium, one or more of the class of the sulfo esters of α-methylene carboxylic acids, and one or more of the class of other polymerizable ethylenically unsaturated compounds that are capable of forming substantially water-insoluble addition polymers.

The sulfo ester constituent can be incorporated in the dispersion in the form of the sulfonic acid or in the form of water-dispersible salts of the sulfonic acid group.

The invention contemplates that the aqueous dispersion of the polymerizable composition may optionally contain conventional emulsifiers, wetting agents, surfactants, and the like, although such constituents can be omitted from the starting composition and, if used, can usually be employed in smaller proportions in accordance with this invention than is possible with known processes.

The invention contemplates that the aqueous starting composition comprising the polymerizable material may contain polymerization catalysts, such as hydrogen peroxide, potassium persulfate, cumene hydroperoxide, α,α'-azobisisobutyronitrile, and the like. In redox polymerization systems, the usual ingredients may be used. The starting composition may include acids, bases, or salts to provide a desired pH value and possibly a buffered system.

The advantages of the present invention are attained when the starting aqueous dispersion comprises from 0.1 to 10, preferably from 0.5 to 5, parts by weight of a sulfo ester of an α-methylene carboxylic acid per 100 parts by weight of the other polymerizable ethylenically unsaturated constituents of the composition. The other constituents of the starting composition can be employed in usual proportions already known in this art. For example, the starting aqueous dispersion usually contains from 5 to 60 percent by weight of the polymerizable constituents and correspondingly from 95 to 40 percent by weight of the aqueous medium, although proportions outside of this range can be used.

The starting composition as described above is subjected to conditions conducive to polymerization of the polymerizable constituents. In most instances the temperature of the aqueous dispersion is raised, e.g. to a temperature in the range from 40° C. to 100° C. to activate the polymerization, although in some instances, particularly those wherein the composition comprises a very active polymerization catalyst, the polymerization can occur at or below room temperature. Other means, such as exposure of the composition to activating radiations, can be employed to promote polymerization of the polymerizable constituents.

The invention contemplates embodiments in which all of the constituents are charged to the starting mixture, and are polymerized therein in a single step, as well as embodiments in which the constituents are charged in a sequence, perhaps coordinated with a polymerization sequence, and/or the polymerization is carried out in plurality of stages. The sulfo ester of the α-methylene carboxylic acid can advantageously be added to the polymerization reaction mixture prior to the polymerization step or at any time prior to the complete polymerization of the polymerizable constituents.

When the compositions comprising a sulfo ester of an α-methylene carboxylic acid and a different polymerizable ethylenically unsaturated compound dispersed in an aqueous medium are polymerized in accordance with this invention, there are obtained aqueous colloidal dispersions of polymeric products which contain the starting sulfo ester and other ethylenically unsaturated compound in polymerically combined form.

These aqueous dispersions are characteristically very stable, i.e. resistant to coagulation of the colloidally dispersed polymer particles, even though they contain little or no conventional emulsifier or stabilizer. In many instances, the polymer dispersions can be mixed with concentrated calcium chloride solutions without causing coagulation of the polymer. In many instances, the dispersion can be vigorously agitated without coagulation under conditions that cause substantial precipitation of ordinary dispersions. In instances where the dispersions contain little or no conventional water-soluble emulsifier, the dispersions often have little or no tendency to foam.

When the polymer dispersions are obtained from starting compositions that were substantially free of water-soluble soaps, wetting agents, stabilizers, and like external solutes, the resulting polymer dispersions are likewise substantially free of such external solutes and are advantageously employed where such solutes are undesirable, e.g. in coatings that are resistant to water.

The latex products or aqueous polymer dispersions obtained in accordance with this invention are useful for a number of purposes. For example, some of the latex dispersions are useful as, or in the preparation of, coating and impregnating compositions, or in the casting of films and the like. Other compositions can be treated, e.g. by spray or other drying, to obtain a dry polymeric product useful in molding or for other purposes. When small amounts of a sulfo ester of an α-methylene carboxylic acid are used, e.g. from 0.1 to approximately one part by weight per 100 parts by weight of a normally hydrophobic ethylenically unsaturated monomer such as styrene, the principal effect on the polymer dispersion is the unusual stability thereof. When larger amounts of the sulfo ester are used, e.g. from 5 to 10 parts by weight thereof per 100 parts by weight of the other ethylenically unsaturated monomer, the resulting dispersion contains a polymer which, when dried, is often readily redispersible in water.

The following examples illustrate the invention but are not to be construed as limiting its scope. In the examples, parts and percentages are by weight unless otherwise noted.

*Example 1*

Into a polymerization vessel was charged a mixture of 47 ml. of water, 3 ml. of 30 percent hydrogen peroxide, ferric nitrate corresponding to 0.25 milligram of iron, 2 grams of technical grade sodiosulfobutyl acrylate (a mixture containing 1-sodiosulfo-2-butyl acrylate and 2-sodiosulfo-1-butyl acrylate, together with some sodiosulfobutyl β-chloropropionate), 31 grams of styrene, and 19 grams of 1,3-butadiene. The vessel was purged of molecular oxygen and closed, and the mixture was agitated and heated at 70° C. for 17 hours.

The resulting polymerization product was a very stable latex, i.e. aqueous colloidal polymer dispersion, containing approximately 45 percent of a solid styrene-butadiene polymer product having sodiosulfobutyl acrylate polymerically bound therein. The latex was stable, even to polyvalent metal cations such as calcium ions, and was suited for use in making latex paints. When a thin layer of the latex was spread on a solid supporting surface and dried, there was deposited an adherent, tough, continuous film.

Aqueous colloidal dispersions of copolymers containing from 40 to 60 mole percent of a conjugated diolefin such as 1,3-butadiene, at least 15 mole percent of an alkenyl-aromatic compound such as styrene, and from 0.1 to 5 percent by weight of a sulfo ester of an α-methylene carboxylic acid are particularly stable and are well suited for use as, or in the preparation of, impregnating and coating compositions such as latex paints.

The technical grade of sodiosulfobutyl acrylate was obtained by interaction of acryloyl chloride on a mixture of the sodium salts of 2-hydroxy-1-butanesulfonic acid and 1-hydroxy-2-butanesulfonic acid to produce a mixture comprising principally 1-sodiosulfo-2-butyl acrylate and 2-sodiosulfo-1-butyl acrylate, together with some of the corresponding sodiosulfobutyl β-chloropropionates.

Example 2

Into a polymerization vessel was charged a mixture of 48 ml. of water, 1 ml. of 30 percent hydrogen peroxide, ferric nitrate corresponding to 0.5 milligram of iron, 0.15 gram of technical grade 2-sodiosulfoethyl methacrylate (assay 73 percent), 10 grams of ethyl acrylate, and 40 grams of vinyl acetate. The mixture was de-oxygenated by blowing with air-free nitrogen after which the vessel was closed, and the mixture was agitated and heated at 70° C. for three hours.

The polymerization product was a stable aqueous colloidal dispersion containing approximately 47 percent of the ethyl acrylate-vinyl acetate polymer. The dispersion, when dried in a thin layer on a supporting solid surface, deposited an adherent, tough, clear and continuous film.

The technical grade of 2-sodiosulfoethyl methacrylate was obtained by heating a mixture of 100 ml. of chlorobenzene, 74 grams of sodium isethionate, and 60 grams of methacryloyl chloride under atmospheric pressure reflux with stirring for one hour. After cooling to room temperature, the reaction mixture was diluted with 500 ml. of acetone and was filtered to collect a filter cake which was washed with acetone and dried to yield 100 grams of white, crystalline product containing 73 percent of 2-sodiosulfoethyl methacrylate and some 2-sodiosulfoethyl $\beta$-chloropropionate.

Example 3

A mixture of 98 ml. of water, 1 ml. of hydrogen peroxide, ferric nitrate corresponding to 0.5 milligram of iron, 1 gram of technical grade 2-sodiosulfoethyl acrylate, and 0.1 ml. of styrene was de-oxygenated by blowing with air-free nitrogen in a polymerization vessel. The vessel was closed, and the mixture was agitated and heated at 70° C. for 8 hours. The resulting polymerization reaction product was a clear solution having a surface tension of 56.4 dyes per cm. at room temperature. To this first-stage polymer solution were added 50 grams of styrene and 1 ml. of 30 percent hydrogen peroxide. After deoxygenation with air-free nitrogen, this mixture was heated at 70° C. with agitation for a further 15 hours.

The resulting polymerization product was a very stable aqueous latex containing approximately 31 percent of colloidally dispersed solid polymer of styrene having approximately 2 percent of 2-sodiosulfoethyl acrylate polymerically combined therein.

The technical grade of 2-sodiosulfoethyl acrylate was obtained by heating a mixture of 200 ml. of o-dichlorobenzene and 74 grams of finely ground sodium isethionate at temperatures between 135° and 145° C. while dropping 50 grams of acryloyl chloride into the mixture over a period of 20 minutes. The temperature was raised to 176° C. for one hour, after which the mixture was cooled to room temperature and was filtered. The filter cake was washed with isopropanol and dried to obtain 94 grams of a white, crystalline product which contained mostly 2-sodiosulfoethyl acrylate, together with some 2-sodiosulfoethyl $\beta$-chloropropionate.

Example 4

A mixture of 98 ml. of water, 1 ml. of 30 percent hydrogen peroxide, ferric nitrate corresponding to 0.5 milligram of iron, 1 gram of technical grade sodiosulfopropyl acrylate (a mixture comprising 2-sodiosulfo-1-propyl acrylate and 1-sodiosulfo-2-propyl acrylate together with some sodiosulfopropyl $\beta$-chloropropionate), and 0.2 ml. of vinylidene chloride was blown with air-free nitrogen in a polymerization vessel. The vessel was then closed, and the mixture was agitated and heated at 70° C. for one hour to obtain a clear, foamy polymer solution. The mixture was cooled to room temperature, the vessel was opened, 50 grams of vinylidene chloride was added, the resulting mixture was again blown with air-free nitrogen to remove any molecular oxygen from the system, the vessel was closed, and the mixture therein was agitated and heated at 70° C. for five hours. There was obtained a very stable latex containing approximately 31 percent of a vinylidene chloride polymer containing approximately one percent of sodiosulfopropyl acrylate polymerically bound therein.

The technical grade of sodiosulfopropyl acrylate was obtained by heating a mixture of 400 ml. of n-heptane, 162 grams of the sodium salt of hydroxypropanesulfonic acid (a mixture of the sodium salts of 2-hydroxy-1-propanesulfonic acid and 1-hydroxy-2-propanesulfonic acid), 100 grams of acryloyl chloride, and 2 grams of hydroquinone at 80° C. for 0.5 hour and at reflux (95° C.) for an additional two hours. The resulting reaction mixture was cooled, and the liquid layer was decanted from a waxy solid. The latter was triturated with diethyl ether yielding a crystalline solid which was collected on a filter, washed with diethyl ether, and dried to obtain 202 grams of a mixture containing mostly 2-sodiosulfo-1-propyl acrylate and 1-sodiosulfo-2-propyl acrylate, together with some of the corresponding sodiosulfopropyl $\beta$-chloropropionates.

In the foregoing examples, stable aqueous colloidal dispersions of polymeric products of sulfo esters of $\alpha$-methylene carboxylic acids and a number of other polymerizable ethylenically unsaturated materials were obtained by polymerization of the corresponding monomers in aqueous dispersion without employment of conventional surfactants or emulsifying agents.

The following example illustrates how the present invention can be used in conjunction with conventional practice to provide an advantageous result.

Example 5

A mixture of 98 ml. of water, 1.875 grams of the dihexyl ester of sulfosuccinic acid (80 percent active wetting agent), 5 ml. of 30 percent hydrogen peroxide, ferric nitrate corresponding to 0.5 milligram of iron, 0.1 gram of potassium pyrosulfate, 1 gram of 2-sodiosulfoethyl acrylate (92 percent assay), 67.5 grams of styrene, and 32.5 grams of 1,3-butadiene in a polymerization vessel was blown with air-free nitrogen. The vessel was then closed, and the mixture was agitated and heated at 70° C. for 12 hours. There was obtained a stable latex containing approximately 48 percent of the styrene butadiene polymer. The average diameter of the colloidally dispersed solid polymer particles was 0.16 micron. The latex was very stable. When 50 ml. of the latex was subjected for two minutes to vigorous stirring in a mixer of the malted milk mixer type, only 0.7 gram of filterable coagulum was produced.

In contrast to these results, when the procedural steps described above were repeated with a starting composition containing the same kind and amounts of constituents described above, but omitting the 2-sodiosulfoethyl acrylate, there was obtained an unstable latex. The resulting latex coagulated completely when subjected for two minutes to agitation in a malted milk type mixer.

Example 6

Into a polymerization vessel was charged a mixture of 99 ml. of water, 1 ml. of 30 percent hydrogen peroxide, ferric nitrate corresponding to 0.5 milligram of iron, 4 grams of technical grade sulfobutyl acrylate (a mixture of 1-sulfo-2-butylacrylate and 2-sulfo-1-butyl acrylate together with some sulfobutyl $\beta$-chloropropionates; the acid form of the technical sodiosulfobutyl acrylate described in Example 1), and 50 grams of monomeric styrene. The mixture was purged by blowing with air-free nitrogen, after which the vessel was closed, and the mixture was agitated and heated at 70° C. for 16 hours. The resulting product was a stable colloidal dispersion containing 28 percent of styrene polymer. The dispersion was very stable to polyvalent cations and could be diluted with concentrated calcium chloride solution without coagulating the latex. Upon evaporation of water, the dispersion deposited a dry, solid, hydrophilic polymer that was redispersible in water to regenerate a stable aqueous colloidal dispersion.

I claim:

1. In a method for making synthetic polymer latexes, the steps of forming an aqueous dispersion of a polymerizable ethylenically unsaturated monomeric material by mixing together in an aqueous medium, from 0.1 to 10 parts by weight of a water-soluble sulfo ester having the formula $$R-CO_2-Q-SO_3M$$

wherein the radical R— is selected from the group consisting of vinyl and α-substituted vinyl, and the radical —Q— is a divalent hydrocarbon radical having its valence bonds on different carbon atoms and M is a cation, and 100 parts by weight of an ethylenically unsaturated liquid monomeric material other than such a sulfo ester, which other ethylenically unsaturated monomeric material is capable of undergoing addition polymerization to form a water-insoluble solid polymer, and polymerizing the monomeric constituents in the presence of a polymerization catalyst to obtain a stable aqueous colloidal dispersion of a copolymeric product comprising recurring units of the sulfo ester.

2. A method according to claim 1 wherein the ethylenically unsaturated monomeric material comprises styrene.

3. A method according to claim 1 wherein the ethylenically unsaturated monomeric material comprises 1,3-butadiene.

4. A method according to claim 1 wherein the ethylenically unsaturated monomeric material comprises vinylidene chloride.

5. A method according to claim 1 wherein the ethylenically unsaturated monomeric material comprises an ester of an acid selected from the group consisting of acrylic acid and α-substituted acrylic acids other than an ester of a hydroxy-sulfonic acid.

6. A method according to claim 1 wherein the sulfo ester is a sulfo-alkyl acrylate.

7. A method according to claim 1 wherein the sulfo ester is a sulfo-alkyl methacrylate.

8. A method according to claim 1 wherein the monomeric sulfo-ester is added to the aqueous dispersion prior to polymerizing the monomeric constituents.

9. A method for making a synthetic polymer latex which comprises emulsifying a monomeric mixture containing between 40 and 60 mole percent of 1,3-butadiene and at least 15 mole percent of styrene into an aqueous medium containing a polymerization catalyst and a sulfo-ester having the formula $$R-CO_2-Q-SO_3M$$

wherein the radical R— is selected from the group consisting of vinyl and α-substituted vinyl, and the radical —Q— is a divalent hydrocarbon radical having its valence bonds on different carbon atoms and M is a cation, the sulfo ester being present in amount corresponding to between 0.1 and 5 parts by weight per 100 parts by weight of the other monomers, heating the resulting emulsion and effecting polymerization of the monomeric constituents to obtain a stable aqueous colloidal dispersion of a copolymer of 1,3-butadiene, styrene and the sulfo ester.

10. The method according to claim 9 wherein the sulfo-ester is a sulfoalkyl acrylate.

11. The method according to claim 9 wherein the sulfo-ester is a sulfo-alkyl methacrylate.

12. A stable aqueous colloidal dispersion comprising an aqueous suspending medium and a colloidally dispersed, water-insoluble, solid addition copolymer of from 0.1 to 10 parts by weight of a sulfo ester having the formula $$R-CO_2-Q-SO_3M$$

wherein the radical R— is selected from the group consisting of vinyl and α-substituted vinyl, and the radical —Q— is a divalent hydrocarbon radical having its valence bonds on different carbon atoms and M is a cation and 100 parts by weight of at least one other ethylenically unsaturated compound.

13. A stable aqueous colloidal dispersion according to claim 12 wherein the colloidally dispersed, water-insoluble, solid addition copolymer is a copolymer of from 0.1 to 5 parts by weight of the sulfo ester and 100 parts by weight of at least one other ethylenically unsaturated compound.

14. A stable aqueous colloidal dispersion according to claim 13 wherein the aqueous suspending medium consists essentially of water.

15. A stable aqueous colloidal dispersion according to claim 13 wherein the aqueous suspending medium consists essentially of water and wherein the colloidally dispersed addition copolymer is a copolymer of 100 parts by weight of a mixture of from 40 to 60 mole percent 1,3-butadiene and correspondingly from 60 to 40 mole percent styrene and from 0.5 to 5 parts by weight of the sulfo ester.

References Cited in the file of this patent

UNITED STATES PATENTS 1,881,172   Daimler et al. _____ Oct. 4, 1932